UNITED STATES PATENT OFFICE.

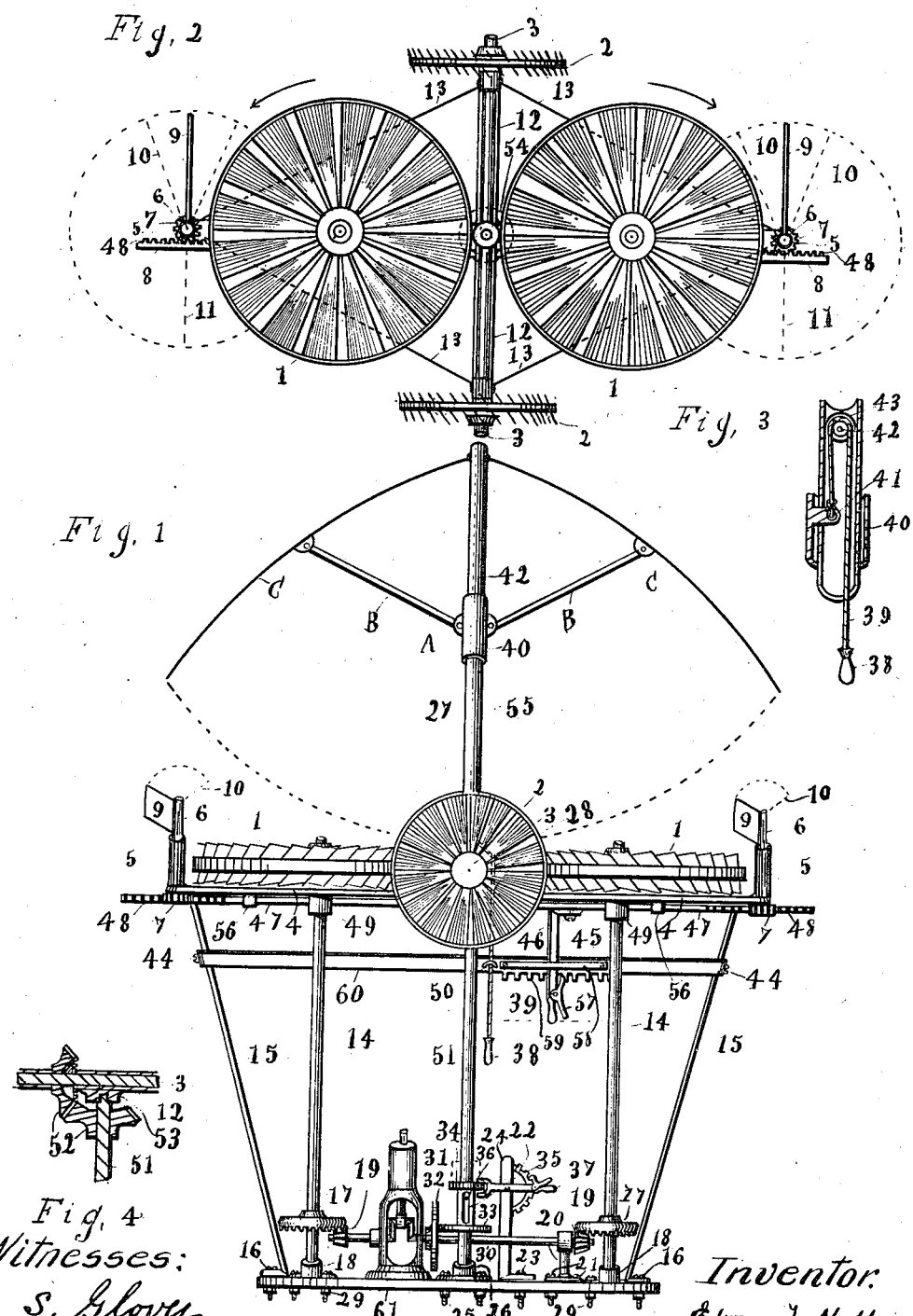

EDWIN LYMAN MADDEN, OF INGERSOLL, OKLAHOMA.

AIRSHIP.

981,778. Specification of Letters Patent. Patented Jan. 17, 1911.

Application filed February 13, 1909. Serial No. 477,629.

*To all whom it may concern:*

Be it known that I, EDWIN L. MADDEN, a resident of Ingersoll, in the county of Alfalfa and State of Oklahoma, have invented certain new and useful Improvements in Airships; and I do hereby declare the following to be a full, clear, and exact description of the invention, such as will enable others skilled in the art to which it appertains to make and use the same.

My invention relates to aerial navigation, the object being, first, to produce a simple, cheap and durable machine; second, to provide against accidents while navigating; third, to minimize the danger from enemies on land, at sea or in mid-air.

With these objects and others subordinate thereto, my invention comprehends the construction and arrangement of parts hereinafter described, illustrated in the accompanying drawings, and succinctly defined in the appended claims.

Referring to the drawings, Figure 1, is a vertical elevation of my entire machine. Fig. 2, a plan view with the parachute closed. Fig. 3, a vertical longitudinal sectional view of the parachute standard. Fig. 4, a vertical horizontal sectional view of gearing which rotates shaft 3.

Similar letters refer to similar parts throughout the several views.

1, and 2, indicate wind wheels, which need no description, they being the same as all wind-mill wheels except they are built of aluminum or other light and flexible material. Wheels 1, which I am pleased to call ascension wheels, are keyed to the end of shafts 14, wheels 2, which I call propelling wheels, are keyed on the ends of shaft 3.

I provide a bar 4, (see Fig. 1) having lateral extensions 12, and brace-rods uniting the free ends of said extensions to the outer ends of the aforesaid bar. On the lower side of bar 4, are downward extensions 49, which are pierced to receive the shafts 14. On the outer ends of bar 4, are upward hollow extensions 5, in which are journaled shafts 6; on one end of said shafts are pinions 7, to the other ends are attached rudders 9; a rod 47, is slidably affixed to the under side of bar 4, by loops 56. On each end of said rod are cogs 48, which engage the pinions 7; an operating handle 45, is attached to the rod 47, by means of screw 46; a thumb-latch 57, on said lever engages cogs 59, on a bar 60, which bar is affixed to the bars 15, with screws 44; a loop 58, keeps the operating handle 45, in proper engagement with the cogs 59. It will be seen when the operating handle is shifted it rotates the shafts 6, and moves the rudders 9, in different directions as indicated by the dotted lines 10, these rudders direct the course of the flight of the machine. A platform 61, is suspended from the bar 4, by rods 15, being affixed thereto by screws 16; the top ends of said rods are welded to bar 4. Journal bearings 18, and 26, are secured to the platform with bolts 25, and 29. In these bearings are positioned the ends of shafts 14, and 51. On shafts 14, are bevel wheels 17.

I provide a gas engine 31, (or other motor power) on the ends of the driven shaft 30, of which are pinions 19, which engage the bevel-wheels 17, and rotate the wheels 1, in opposite direction which is a very important feature of my invention. One end of said shaft being supported by a standard 20, and secured to the platform by screws 21. On said shaft is rigidly affixed a disk 32. On shaft 51, is slidably mounted a thimble, said thimble having a rectangular opening 35, through which a key 36, enters the shaft 51: on each end of said thimble are disks 33, and 34, the perimeter of disk 33, being in frictional contact with the plane of disk 32. A vertical standard 24, is affixed to the platform with a bolt 23; a toothed quadrant 22 is welded to the aforesaid standard which engages a thumb-latch on the end of a pivoted lever 37, the free end of said lever being bifurcated to receive the disk 34. A metallic tube 55, having a vertical slot 27, therein, has slidably mounted thereon a thimble 40: on the interior of said thimble is a lug which moves in the slot 27, as illustrated in Fig. 3. In the free end of said lug is a hole 41, in which is tied a cord 39, this cord extends up over a sheave 42, which is pivotally mounted within the tube 55. A semicircle shield 43, is placed within the tube adjacent to the sheave which is for the purpose of keeping the cord 39, on the sheave. This cord extends down and out of the end of the tube and passes by the shaft 3, as indicated by the dotted lines 28, and passes through a staple 50, in the bar 60; on the free end of said cord is a handle 38. It will be seen when this cord is pulled it will run the thimble 40, up on the tube 55. On the perimeter of said thimble are lugs A, to which are pivoted arms B, the other ends of said arms being pivoted to wings C, which wings are covered with canvas, or other suitable material.

Any further instructions as regards the construction and assembling of this parachute is unnecessary as it is exactly like an ordinary umbrella. The free end of the tube 55, is welded to the bar 4, and in a perpendicular position as shown.

Having described the construction and assembling of my machine I will now describe its operation generally. When I desire to make an ascension I start the engine and rotate the wheels 1, at a high rate of speed, which wheels turn in opposite directions, the parachute being closed down or folded up like an umbrella. The machine will ascend straight up. It is to be noted the disk 33, is contacting near the center of the disk 32, which imparts a very slow movement to wheels 2. When it is wanted to move the machine forward the disk 33, is moved out near the perimeter of disk 32, by means of the operating handle 37, which imparts a movement to the wheels 2, proportionate to the distance the thimble 40, is raised on the shaft 51, by which means I can propel my machine at any speed desired. When traveling in mid-air I direct my course by means of the rudders 9; by shifting the lever 45, I can move the rudders in any desired position as shown by the dotted lines 10, and 11. When I want to descend I pull the cord 39, which opens the parachute as shown in Fig. 1, which always insures a positive and instantaneous response.

I claim—

1. In an air ship, a bar having lateral extensions, brace rods uniting the free ends of said bar and extensions, upward extending bearings on said bar, bearings extending downward from said bar, shafts journaled in the aforesaid upward extensions, pinions on said shafts, rudders rigidly attached to said shaft, substantially as described.

2. In an air ship, a bar having lateral extensions, brace rods uniting the free ends of said bar and extensions, upward extending bearings mounted on said bar, bearings extending downward from said bar, shafts journaled in the aforesaid upward extensions, pinions on said shafts, rudders rigidly attached to said shafts and means for rotating said pinions to shift said rudders, substantially as described.

3. In an air ship, a bar having lateral extensions, brace rods uniting the free ends of said members, bearings extending downward from said bar, vertical shafts journaled in said bearings, ascension wheels affixed to said shafts, bevel wheels on said shafts, means for rotating said bevel and ascension wheels respectively in opposite directions, propelling wheels and means for rotating said wheels at various rates of speed, means for guiding the ship in different directions, as described and set forth.

4. In an air ship a bar having lateral extensions, brace rods uniting the free ends of said bars, upward extending bearings mounted on said bar, shafts journaled in said extensions, rudders and pinions affixed to said shafts, bearings extending downward from said bar, vertical shafts journaled in said extensions, ascension wheels affixed to said shafts, bevel wheels on said shafts, bars extending downward from the aforesaid bar and bearing a platform, means for rotating the ascension wheels in opposite directions, propelling wheels and means for rotating the said wheels at various rates of speed, means for shifting the rudders to guide the ship in different directions, a parachute for descending from mid-air and means for opening the same, as described and set forth.

5. In an air ship, a bar having lateral extensions, brace rods uniting the free ends of said members, bearings extending downward from said bar, vertical shafts journaled in said bearings, ascension wheels affixed to said shafts, beveled wheels on said shafts, and means for rotating said bevel wheels, shafts and ascension wheels at various rates of speed, a shaft carrying propelling wheels transversely mounted on the aforesaid bar shafts carrying rudders and pinions mounted on the outer ends of the aforesaid bar, means for rotating said pinions to shift the rudders, bars extending downward from the aforesaid bar and bearing a platform, substantially as described.

6. In an air ship, a bar having lateral extensions, brace rods uniting the free ends of said members, bearings extending downward from said bar, vertical shafts journaled in said bearings ascension wheels affixed to said shafts, beveled wheels on said shafts, and means for rotating said bevel wheels and ascension wheels in opposite directions and at various rates of speed, a shaft carrying propelling wheels transversely mounted on the aforesaid bar, shafts carrying rudders, and pinions mounted on the outer ends of the aforesaid bar, means for rotating said pinions to shift the rudders, bars extending downward from the aforesaid bar and bearing a platform, as set forth.

7. In an air ship, a bar having lateral extensions, brace rods uniting the free ends of said members, bearings extending downward from said bar, vertical shafts journaled in said bearings, ascension wheels affixed to said shafts, beveled wheels on said shafts, a shaft carrying propelling wheels transversely mounted on the aforesaid bar, bars carrying rudders, and pinions mounted on the ends of the last mentioned shafts, means for rotating said pinions to shift the rudders, bars extending downward from the aforesaid bar and bearing a platform, means for rotating said beveled wheels, shafts, and ascension wheels respectively at various rates of speed and in opposite directions, means for rotating the propelling wheels at various rates of speed, means for guiding the ship in different directions, as described and set forth.

8. In an air ship, a bar having lateral extensions, brace rods uniting the free ends of said bar and extensions, upward extending bearings mounted on said bar, bearings extending downward from said bar, vertical shafts journaled in said downward extensions, ascension wheels affixed to said shafts, bevel wheels on said shafts, bars extending downward from the aforesaid bar and bearing a platform, means for rotating the ascension wheels in opposite directions, propelling wheels and means for rotating said wheels at various rates of speed, means for guiding the ship in different directions, a parachute having an oblong opening in the tube thereof, a slidable thimble on said tube, having a lug projecting through the aforesaid oblong opening, a cord extending from said lug over a sheave, pivoted within said tube whereby said parachute may be raised when descending from mid air substantially as described.

In testimony whereof, I have signed this specification in the presence of two subscribing witnesses.

EDWIN LYMAN MADDEN.

Witnesses:
 OWEN COPPOCK,
 A. C. MADDEN.